US006989641B2

(12) United States Patent
Schulz et al.

(10) Patent No.: US 6,989,641 B2
(45) Date of Patent: Jan. 24, 2006

(54) METHODS AND APPARATUS FOR FAULT-TOLERANT CONTROL OF ELECTRIC MACHINES

(75) Inventors: Steven E. Schulz, Torrance, CA (US); Nitinkumar R. Patel, Cypress, CA (US); James M. Nagashima, Cerritos, CA (US); Yu-Seok Jeong, Seoul (KR); Seung Ki Sul, Seoul (KR)

(73) Assignee: General Motors Corporation, Detroit, MI (US)

( * ) Notice: Subject to any disclaimer, the term of this patent is extended or adjusted under 35 U.S.C. 154(b) by 48 days.

(21) Appl. No.: 10/452,817

(22) Filed: Jun. 2, 2003

(65) Prior Publication Data

US 2004/0239272 A1 Dec. 2, 2004

(51) Int. Cl.
*B60L 3/00* (2006.01)

(52) U.S. Cl. ...................... 318/139; 318/700; 318/474; 318/490

(58) Field of Classification Search ................ 318/727, 318/732, 734, 139, 474, 490, 810, 811, 563, 318/565, 690, 439, 798–815; 324/500, 545, 324/772; 361/23, 31, 33
See application file for complete search history.

(56) References Cited

U.S. PATENT DOCUMENTS 4,509,110 A * 4/1985 Levesque et al. ............. 700/33
4,695,941 A * 9/1987 Kumar ........................ 700/45
4,761,703 A * 8/1988 Kliman et al. ................ 361/23
4,943,758 A * 7/1990 Tsurumiya .................. 318/504
5,254,921 A * 10/1993 Matsubara .................. 318/561
5,357,181 A * 10/1994 Mutoh et al. ............... 318/139
5,469,032 A * 11/1995 Otake ......................... 318/439
5,514,978 A * 5/1996 Koegl et al. ................ 324/772
5,661,380 A * 8/1997 Obara et al. ................ 318/139
5,677,611 A * 10/1997 Yoshihara et al. .......... 318/803
5,689,170 A * 11/1997 Ishikawa .................... 318/811
5,739,649 A * 4/1998 Akao ......................... 318/139
5,912,539 A * 6/1999 Sugitani et al. ............. 318/434
6,046,553 A * 4/2000 Matsunaga et al. ......... 318/139
6,054,827 A * 4/2000 Takatsuka et al. .......... 318/474
6,064,172 A * 5/2000 Kuznetsov .................. 318/716
6,359,405 B1 * 3/2002 Tsurumi ..................... 318/434
6,683,435 B1 * 1/2004 Liang et al. ................ 318/727

* cited by examiner

*Primary Examiner*—Marlon T. Fletcher
*Assistant Examiner*—Eduardo Colon Santana
(74) *Attorney, Agent, or Firm*—Christopher DeVries

(57) ABSTRACT

A method for controlling an electric machine having current sensors for less than every phase of the electric machine includes operating a processor to perform a test to preliminarily determine whether a fault exists in one or more of the current sensors and a test to finally determine that the fault exists in the one or more current sensors. The method further includes operating the processor to utilize a state observer of the electric machine to estimate states of the electric machine, wherein the state observer is provided state input measurements from each non-faulty current sensor, if any. Measurements from the current sensor or sensors determined to be faulty are disregarded. The processor controls the electric machine utilizing results from the state observer.

10 Claims, 7 Drawing Sheets

METHODS AND APPARATUS FOR FAULT-TOLERANT CONTROL OF ELECTRIC MACHINES

FIELD OF THE INVENTION

The present invention relates to AC motor drive systems, and more particularly to methods and apparatus for fault tolerant control of AC motor drive systems in the presence of current sensor faults.

BACKGROUND OF THE INVENTION

Most high performance AC motor drive systems today utilize phase current sensors. Phase current information is used for controlling the machine stator currents, which in turn indirectly control machine torque. Failure of a current sensor usually results in loss of control and shutdown of the AC motor drive system.

Recently, fault tolerant control of AC motor drives has been receiving attention in the literature due to increasing application of AC drives in the automotive industry. For example, Raymond Sepe, Jr. ("Fault Tolerant Operation of Induction Motor Drives with Automatic Controller Reconfiguration", IEMDC 2001, which is hereby incorporated by reference in its entirety) addressed current sensor faults of the induction machine type drive. In the case of current sensor failure, the drive is reconfigured from indirect field-oriented control (IFOC) to volts/Hz scalar control. Although this approach may be suitable for asynchronous induction machine drives, it is not applicable to permanent magnet (PM) type synchronous machine drives.

Field oriented control schemes are the industry standard in high performance AC drives today. Field oriented control relies on synchronous frame current regulators to correctly control machine torque. Current information is most often obtained by sensing two of the three stator phase currents. Only two sensors are needed for a machine because the machine is presumed to have balanced three-phase currents. The third current is simply calculated from the two measured currents.

In the case of a current sensor failure, the machine currents become unregulated. Usually, current will become excessive and cause an inverter to enter a fault mode that shuts down the drive. Without current sensor information, a conventional drive system is unable to resume operation.

SUMMARY OF THE INVENTION

Some configurations of the present invention therefore provide a method for controlling an electric machine having current sensors for less than every phase of the electric machine. The method includes operating a processor to perform a test to determine whether a fault exists in one or more of the current sensors. The method further includes operating the processor to utilize a state observer of the electric machine to estimate states of the electric machine, wherein the state observer is provided input measurements from non-faulty current sensors, if there are any such current sensors. Measurements from the current sensor or sensors determined to be faulty are disregarded. The processor controls the electric machine utilizing results from the state observer. In some configurations, a first test is performed to preliminarily determine that a fault exists in one or more of the current sensors and another test is performed to finally determine that the fault exists in the one or more preliminarily determined current sensors. The first test may include a balancing test, a gain error test, and an offset error test.

Various configurations of the present invention provide an apparatus for controlling an electric machine having current sensors for less than every one of its phases. The apparatus includes an inverter configured to provide current to the electric machine and a processor configured to control the current provided to the electric machine by the inverter in accordance with a desired torque, power, or speed. The processor is further configured to utilize the inverter to test the current sensors to determine whether a fault exists in one or more of the current sensors. If a fault is determined to exist, the processor is also configured to utilize a state observer of the electric machine to estimate states of the electric machine, utilizing state input measurements from each non-faulty current sensor, if any. The processor is further configured to disregard the current sensor or sensors determined to be faulty; and to control the electric machine utilizing the inverter and results from the state observer.

Various configurations of the present invention allow AC motor drive systems to advantageously restart following detection of one or more current sensor faults. Thus, operation of the drive system can continue, albeit sometimes with reduced performance. Moreover, configurations of the present invention offer a type of fault control that is applicable to PM-type drive systems.

More particularly, configurations of the present invention allow an AC motor drive system to resume operation in a graceful manner, possibly with some degradation in performance. This capability may be important in certain applications. For example, configurations of the present invention utilized in an electric vehicle (EV) or hybrid-electric vehicle (HEV) allow a driver to "limp home" following a current sensor failure.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
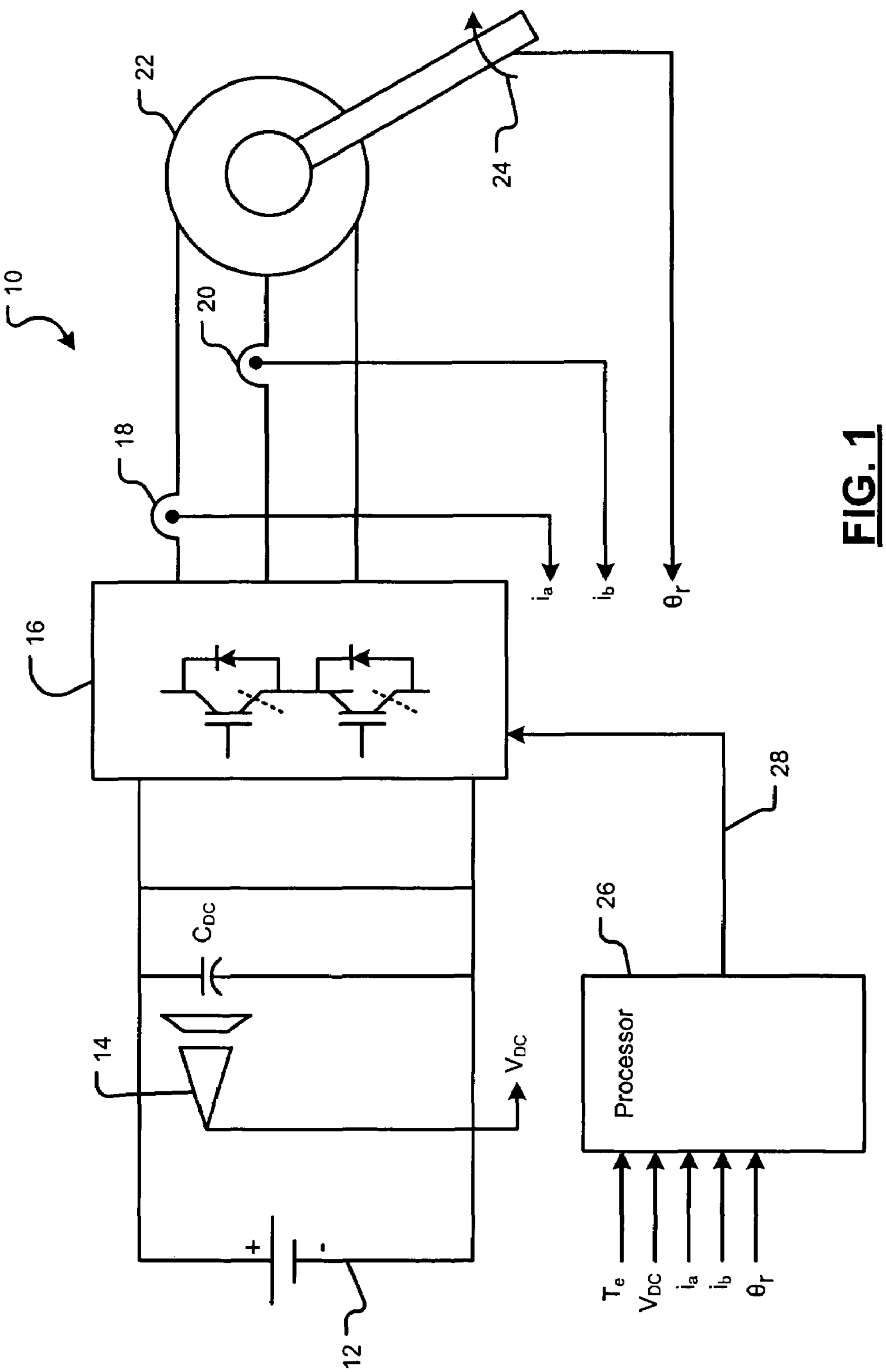
FIG. 1 is a schematic diagram representative of AC motor drive systems of the present invention.

More particularly, and referring to FIG. 1, two phase current sensors are utilized with a three phase machine in some configurations of motor drive control apparatus 10 of the present invention. The drive system comprises a DC source 12 (which, in electrical vehicle configurations, may be a battery pack), a DC bus capacitor $C_{DC}$, a DC bus voltage sensor 14, a 3-phase inverter 16, two current sensors 18 and 20, an AC motor 22, and a position sensor 24. More generally, an electric machine 22 is provided with one less current sensor (18 and 20) than the number of windings of electric machine 22, and inverter 16 is provided with the same number of phases as electric machine 22. Also provided is a processor 26, which may comprise or consist of a stored program microprocessor or microcontroller with memory and digital to analog (D/A) and analog to digital (A/D) converters. Processor 26 has at least one input $T_e$ that is a control signal indicative of a desired torque, speed, or power to be produced by electric machine 22. Processor 26 also utilizes signals $i_a$ and $i_b$ from current sensors 18 and 20, respectively, as well as $\theta_r$ from position sensor 24 and $V_{dc}$ from bus voltage sensor 14. Using these signals, Processor 26 generates a set of gate drive signals 28 for inverter 16. For example, electric machine 22 may be an interior permanent magnet (IPM) motor, and processor 26 may comprise an IPM control. IPM controls are well-known to those of ordinary skill in the art and do not require further explanation here. Inverter 16 provides current to electric machine 22. More precisely in many configurations, inverter 16 provides current to electric machine 22 by gating or pulse width modulating current provided by voltage source 12. Processor 26 is configured, such as by using a stored program, to control the current provided by inverter 16 to electric machine 22 in accordance with a desired torque, power, or speed. For example, a signal $T_e$ is provided for this purpose.

In some configuration, control is accomplished utilizing a diagnostic component and a post-fault control component. To simplify the present explanation, it will be assumed that electric machine 22 is, in fact, an AC motor of the interior permanent magnet type, but the present invention is applicable to other types of motors, as well.

A sudden severe fault of a current sensor 18 or 20 will result in an over current malfunction of motor drive control apparatus 10. If there is no protection provided in the gate drive circuit for inverter 16, the severe fault will lead to unrecoverable faults of power semiconductors of inverter 16. Minor faults, such as gain and offset drifts of current sensors 18 and/or 20 would result in torque pulsations that are synchronized with inverter 16 output frequency. Large offset and/or scaling errors will degrade torque regulation. Offset and gain drift above a certain level will result in over current fault at high speeds of electric machine 22 and in heavy load conditions.

According to various configurations of the present invention, faults including the offset and gain drift are detected when electric machine 22 is not rotating. More particularly, processor 26 is configured, such as by a stored program, to utilize inverter 16 to test current sensors 18 and 20 to determine whether a fault exists in one or more of the current sensors. If a fault is determined to exist, processor 26 utilizes a state observer of electric machine 22 to estimate states of the electric machine, utilizing state input measurements from non-faulty current sensors 18 and/or 20, if any are non-faulty. Current sensors determined to be faulty are disregarded so that their measurements are not used. Processor 26 is further configured to control electric machine 22 utilizing inverter 16 and results from the state observer.

Figure 2:
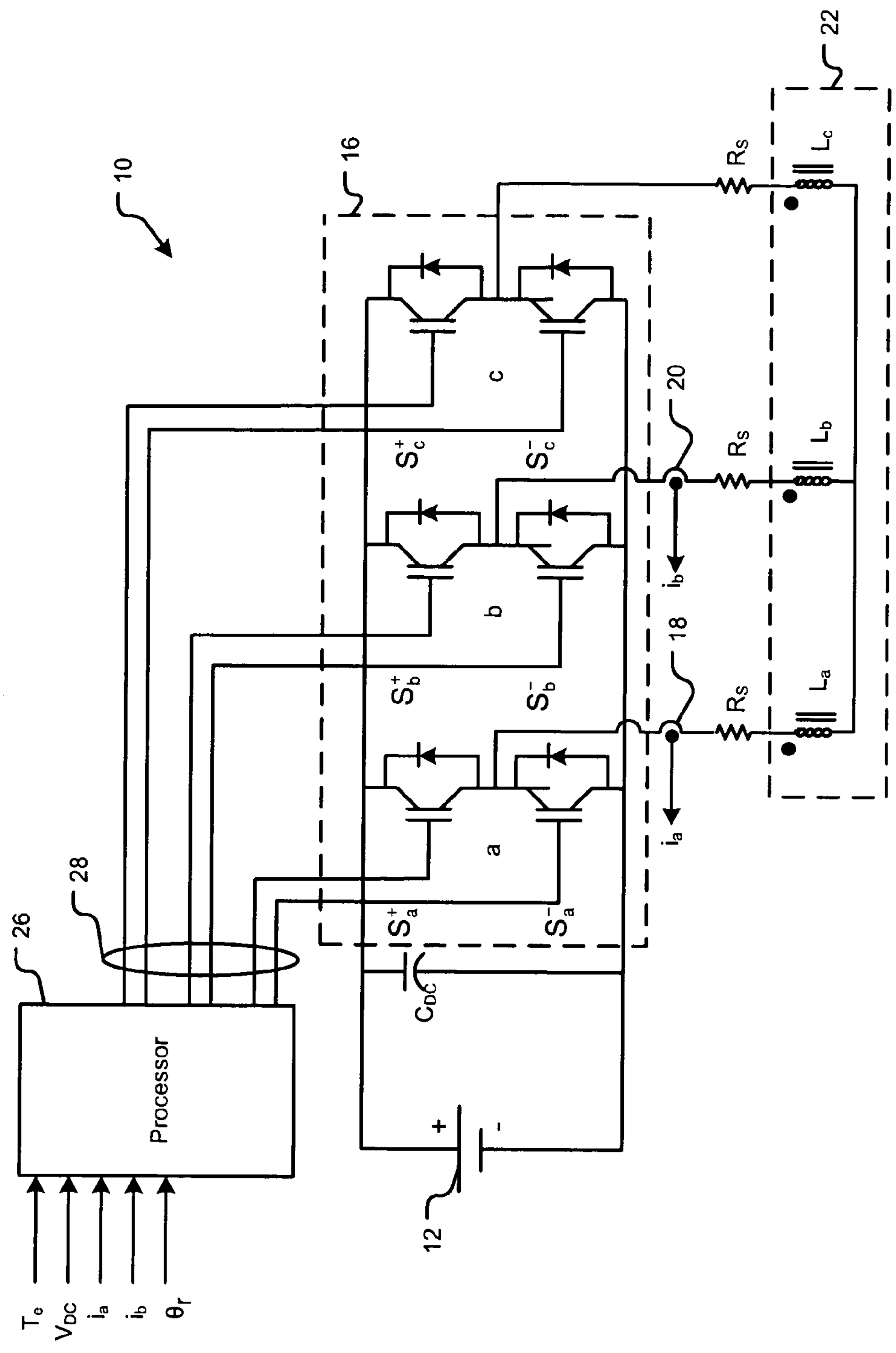
FIG. 2 is a schematic diagram of the AC motor drive system of FIG. 1, with some additional details added for explanatory purposes. Not all of the components shown or implied by FIG. 1 are shown in FIG. 2.
Figure 3:
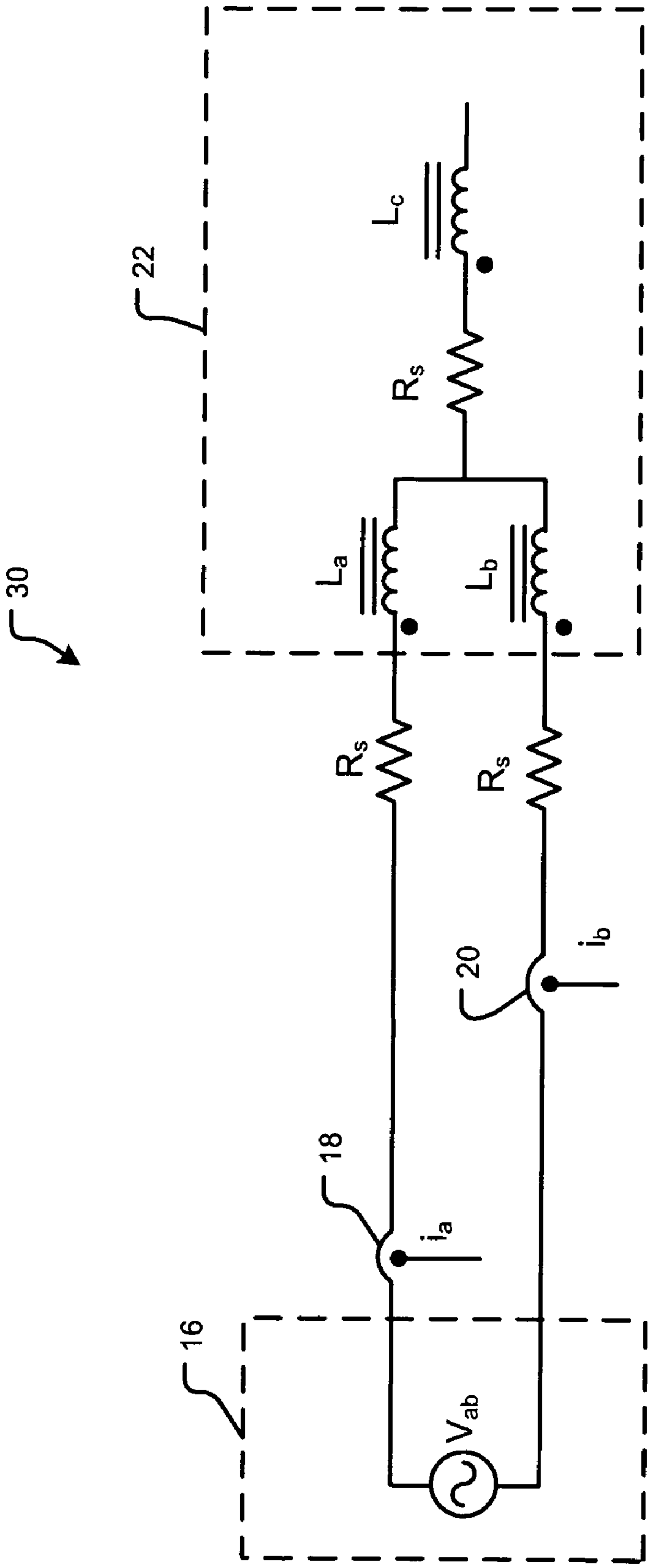
FIG. 3 is an equivalent circuit of FIG. 2 used for computational and illustrative purposes.

Thus, in some configurations and referring to FIG. 2, gating signals to c-phase semiconductor switches $S_c^+$ and $S_c^-$ are blocked initially by processor 26. A line to line test voltage waveform, $V_{ab}=V_m \sin(\omega t+\alpha)$, is synthesized by the pulse width modulation (PWM) inverter 16 under control of processor 26. ($V_m$ is the magnitude of a test voltage, $\omega$ is the angular frequency of the voltage, and $\alpha$ is the initial phase of the voltage.) A portion of circuit 10 in FIG. 2 can be analyzed using an equivalent circuit 30 shown in FIG. 3. Let $L_{ab}$ represent the inductance between an a-phase terminal and a b-phase terminal of electric machine 22. $L_{ab}$ is a function of rotor position. Let $R_s$ represent the sum of stator resistance of a phase winding of an IPM motor used as electric machine 22 and the conduction resistance of the power semiconductors. The current in the circuit resulting from application of the voltage $V_{ab}$ is:

$$i_a = -i_b = \frac{V_m}{Z}\sin(\alpha-\phi)\exp^{-\frac{2R_s}{L_{ab}}t} + \frac{V_m}{Z}\sin(\omega t+\alpha-\phi), \text{ where}$$

$$Z = \sqrt{4R_s^2 + (\omega L_{ab})^2}, \text{ and } \phi = \tan^{-1}\frac{\omega L_{ab}}{2R_s}.$$

It can be seen that the transient term $$\frac{V_m}{Z}\sin(\alpha-\phi)\exp^{-\frac{2R_s}{L_{ab}}t}$$

can be suppressed by adjusting the phase of the applied voltage $V_{ab}$ according to power factor of circuit 30.

Figure 4:
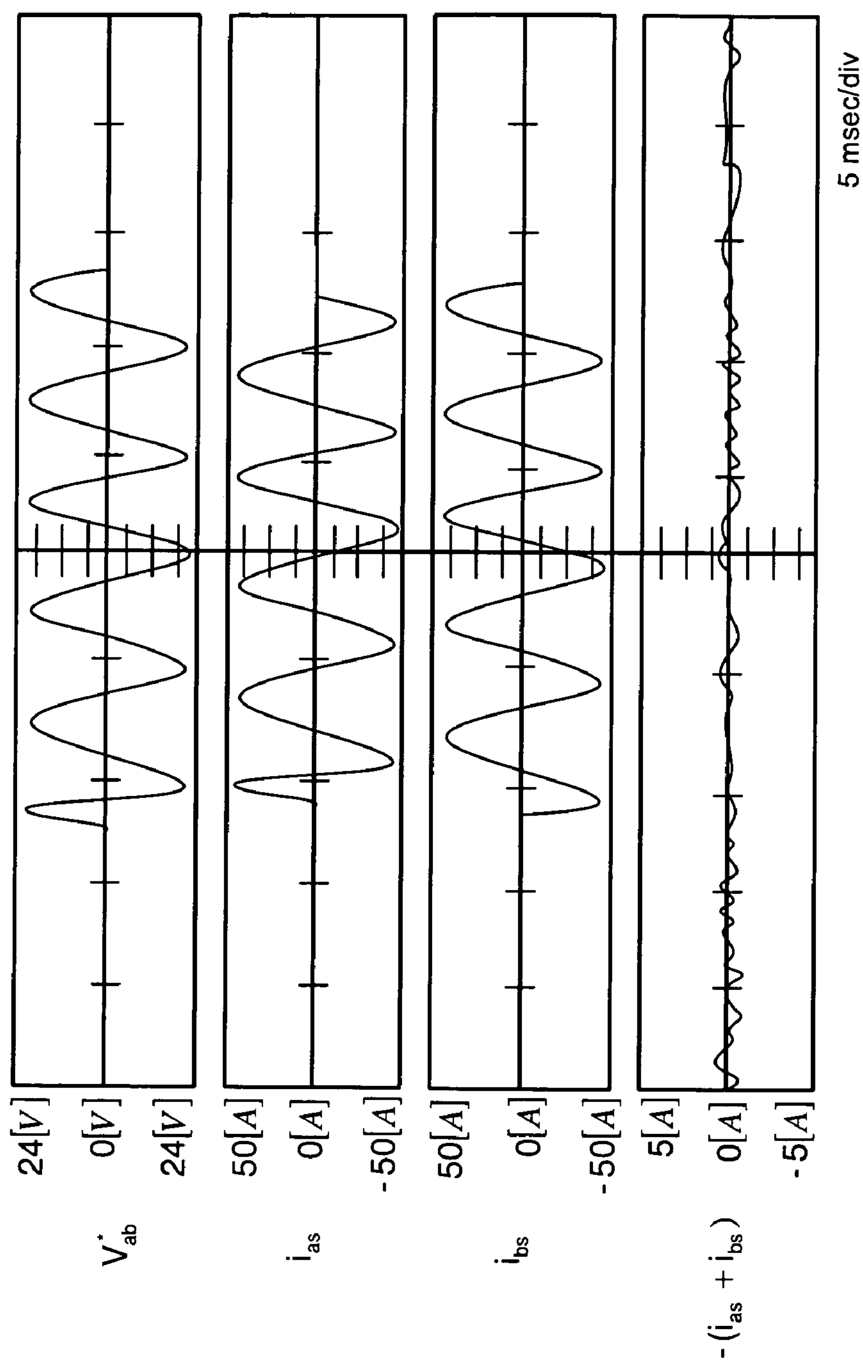
FIG. 4 is a graphical illustration of certain voltages and currents applied to and measured from the circuit of FIG. 3.

Processor 26 samples the sensed values of a-phase and b-phase currents $i_{as}$ and $i_{bs}$, or more precisely, uses samples measurements from current sensors 18 and 20 as a function of time to infer time-varying currents $i_{as}$ and $i_{bs}$. In FIG. 4, traces of sensed a-phase and b-phase currents $i_{as}$ and $i_{bs}$, respectively, are shown along with the applied reference voltage $V_{ab}^*$ for a properly operating electric machine 22 with properly operating current sensors 18 and 20. Also shown is the function $-(i_{as}+i_{bs})$, which is essentially zero over the entire interval during which the input test voltage waveform is applied. The results in FIG. 4 represent a test performed utilizing an electric machine 22 having an inductance of several hundred $\mu$H and a resistance of approximately 10 m$\Omega$ including the resistance of power semiconductors. The time constant of the circuit was several tens of msec. With a proper setting of initial phase angle of the reference voltage there is no DC transient in the current trace. The frequency of the test voltage waveform was 200 Hz and the duration was five cycles. Hence, this test required only 50 msec to perform.

If the windings of electric machine 22, inverter 16, and current sensors 18 and 20 have no problem, sampled a-phase and b-phase currents $i_{as}$ and $i_{bs}$, respectively, should be the same in magnitude and opposite in sign as shown in FIG. 4. This comparison comprises a balancing test on the two of the three windings of electric machine 22 that have current sensors. Circuit tolerances will make a perfect match unlikely, but an engineer skilled in the art will be able to determine, perhaps empirically, a predetermined limit $\pm\epsilon_1$ such that $i_{as}=-i_{bs}\pm\epsilon_1$ is indicative of acceptable control of electric machine 22. The predetermined limit may include a percentage error instead of, or in addition to, a constant error. Also, the root mean square (RMS) value of the sampled current should be approximately $$\frac{V_m}{Z\sqrt{2}}$$

for each phase current, individually. Thus, a gain error test comprises determining whether the RMS values of the sampled currents are within a (perhaps empirically determined) second predetermined limit that defines a predetermined nominal range. Furthermore, the sum of the measured values of each phase current should be around zero due to the zero DC transient and integer number of excitation cycles. A test of whether this sum is less than a (perhaps empirically determined) predetermined value or values comprises an offset error test. If the sum is not zero or near zero, there might be significant offset error in one or more current sensors 18, 20 or faults at inverter power circuit 16 or IPM motor 22 windings $L_a$, $L_b$, or $L_c$.

A combination of the balancing test, gain error test, and offset error test can determine whether one or more faults exists and preliminarily identify which of the two current sensors may be at fault. For example, if the balancing test or offset error test fails, one or both current sensors may be at fault. If the gain error test fails, the sampled current or currents that failed the test indicates which sensor may be at fault. These tests do not, however, rule out the possibility that something other than a sensor (e.g., a motor winding) may be at fault instead of a sensor. Thus, another test is performed if a fault is indicated to determine that the identified current sensor or sensors is or are at fault.

Figure 5:
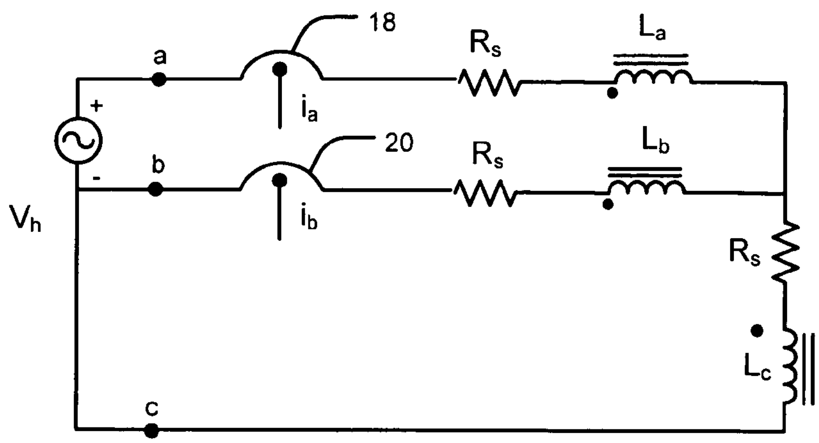
FIGS. 5, 6, and 7 represent equivalent circuits to FIG. 2 illustrative of three different modes of voltage application to the windings of the electric machine of FIG. 2 during a test to finally determine that one or more of the current sensors of FIG. 2 are faulty.
Figure 6:
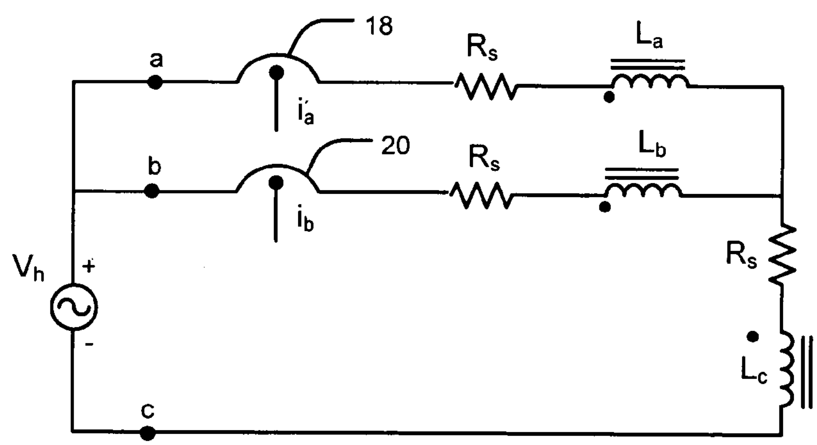
Figure 7:
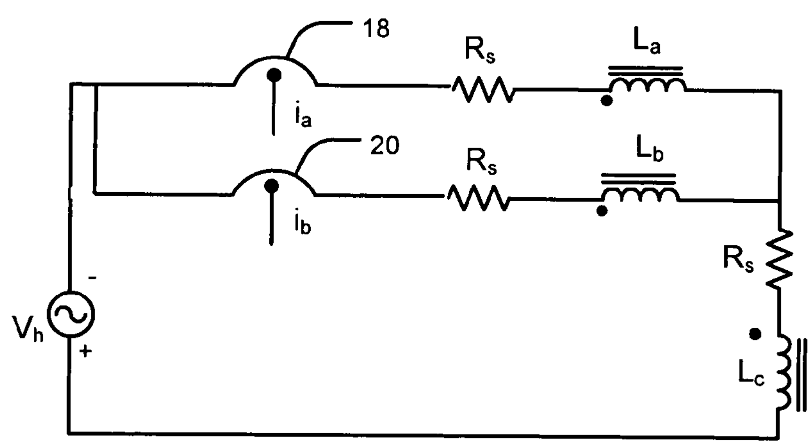

For this additional test, and referring to FIG. 5, a second test voltage waveform $V_h=V_m\sin(\omega t+\alpha)$ is applied between the a-phase and b-phase terminals of the motor. This second test voltage is synthesized by the pulse width modulation inverter 16 under control of processor 26. Also under control of processor 26, the c-phase terminal is shorted with the b-phase terminal by sending appropriate gate drive signals to c-phase. The a-phase and/or b-phase current are measured and stored in a memory of the processor 26. Next, the second test voltage is applied between b-phase and c-phase as shown in FIG. 6 and lastly as between b-phase as c-phase, as shown in FIG. 7. The sum of stored values at each corresponding time point of the measured phase currents in FIGS. 5, 6, and 7 should be zero if inverter 16 and the a-, b-, and c-phase motor 22 windings $L_a$, $L_b$, and $L_c$ are well balanced. More particularly, if the sum of values is less than a (possibly empirically determined) magnitude, it is finally determined that the current sensors preliminarily determined to be at fault by the other tests are, in fact, faulty.

Figure 8:
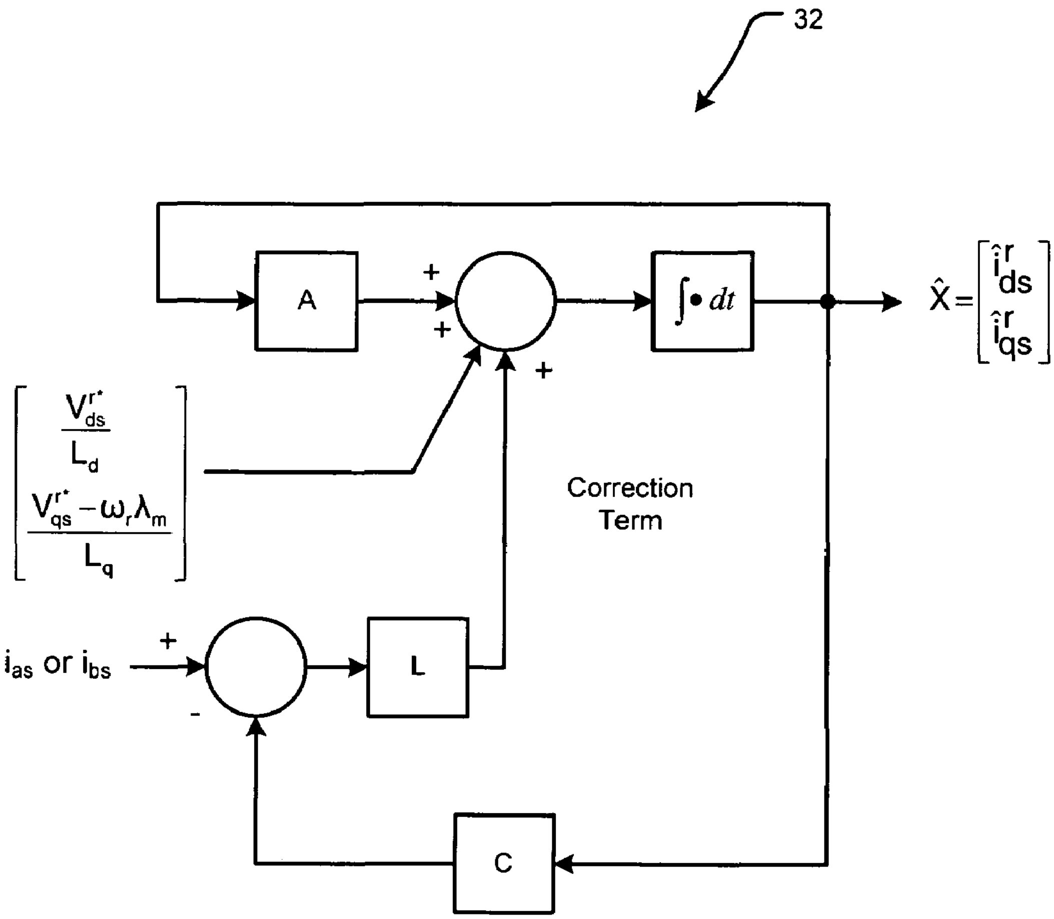
FIG. 8 is a representation of a state observer that can be utilized by the processor of the circuit of FIG. 2 to provide control of the electric machine of FIG. 2 when one of the current sensors is faulty.

If one or more current sensors are finally determined to be faulty, the measured value from the sensor is subsequently disregarded by processor 26. Instead, and referring to FIG. 8, a state observer 32 of electric machine 22 is used by processor 26 to regulate current to electric machine 22 provided by PWM inverter 16. Referring to FIG. 8, an observer is utilized in some configurations of the present invention to provide estimated current information for processor 26. Current in the rotating d-q axis is regulated based upon estimated d-q current. Estimated d-q current is observed by an open-loop observer in the case of faults of both current sensors 18 and 20, or by a closed-loop observer in the case of a single current sensor ( 18 or 20 ) fault. The structure of the observer is shown in FIG. 8, where if a non-faulted current sensor is available, the measured value is used as a correction term and is fed back to state estimator to reduce the estimation error.

The output of the observer is the estimated state vector X, which contains the estimated synchronous frame currents $\hat{i}_{ds}^{r}$ and $\hat{i}_{qs}^{r}$. Matrix A is a state matrix. Matrix C feeds back estimated states to be compared with measured stator currents (if available). Matrix L scales the measurement error to feedback into the observer as a correction term which reduces observer errors.

Figure 9:
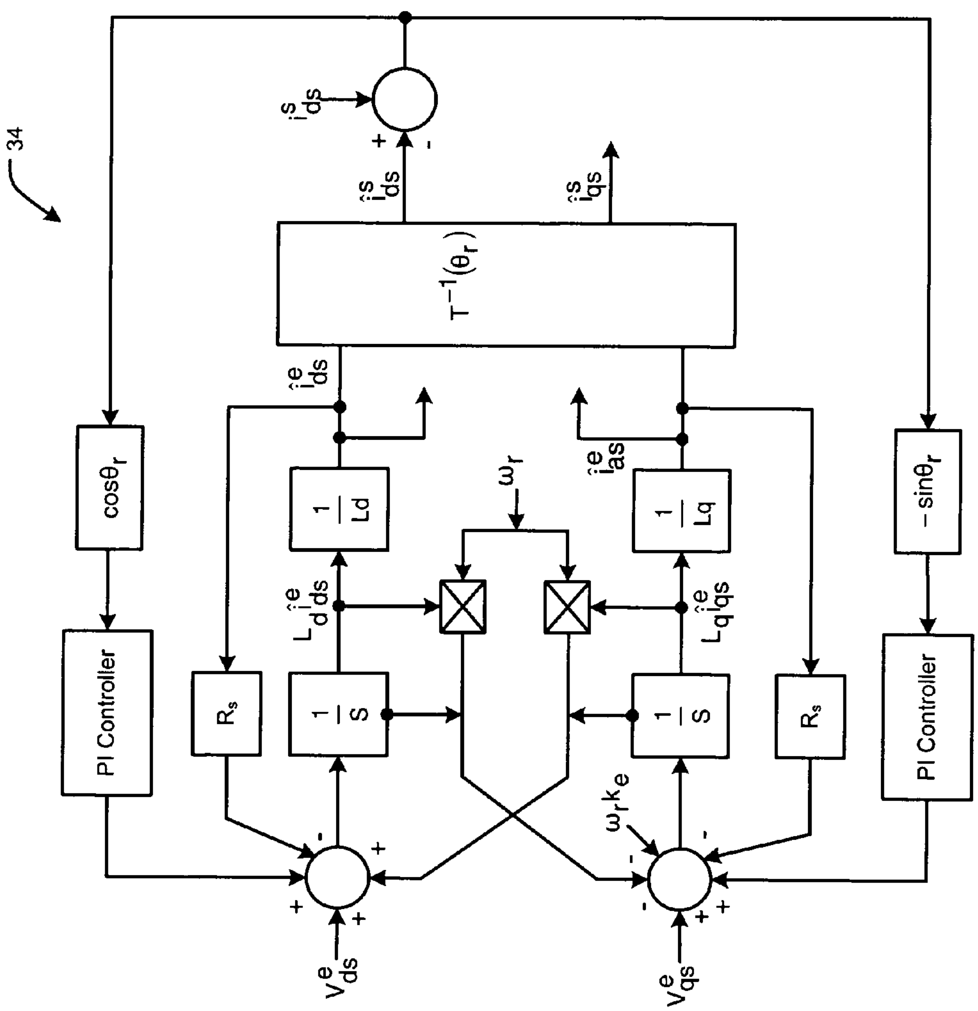
FIG. 9 is a representation of another state observer that can be utilized by the processor of the circuit of FIG. 2 to provide control of the electric machine of FIG. 2 when one of the current sensors is faulty.

In some configurations and referring to FIG. 9, electric machine 22 is an interior permanent magnet motor, and a synchronous frame current estimator 34 is used as state observer 32.

More generally, the state observer provided is modeled after the type of electric machine utilized as electric machine 22.

These experiments illustrate how moderate performance can be achieved in the presence of current sensor faults, thus allowing operation with degraded performance for the desired "limp home" capability.

More particularly, various configurations of the present invention allow AC motor drive systems to advantageously restart following detection of one or more current sensor faults. Thus, operation of the drive system can continue, albeit sometimes with reduced performance. Moreover, configurations of the present invention offer a type of fault control that is applicable to PM-type drive systems.

In addition, configurations of the present invention allow an AC motor drive system to resume operation in a graceful manner, possibly with some degradation in performance. Such capability is of great utility in electric vehicles (EV) and hybrid-electric vehicles (HEV), where such capability allows a driver to "limp home" or provide sufficient traction to pull the vehicle to a safe location following such a current sensor failure.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for controlling an electric machine having current sensors for less than every phase of the electric machine, when a fault occurs in one or more of the current sensors, said method comprising operating a processor to:

perform a test to determine whether a fault exists in one or more of the current sensors;

utilize a state observer of the electric machine to estimate states of the electric machine, wherein said state observer is provided input measurements from non-faulty current sensors, if any, disregarding measurements from the current sensor or sensors determined to be faulty; and control the electric machine utilizing results from the state observer;

wherein said performing a test to determine that a fault exists in one or more of the current sensors comprises operating a processor to:

perform a test to preliminarily determine that a fault exists in one or more current sensors; and perform a test to finally determine that the fault exists in the one or more current sensors;

wherein the electric machine is a three-phase motor having three windings with current sensors on two of the three windings, and wherein performing a test to preliminarily determine that a fault exists in one or more current sensors comprises operating a processor to:

apply a first test voltage waveform to the two of the three windings having a current sensor;

sample measurements from the two current sensors as a function of time;

perform a balancing test on the two windings with current sensors utilizing the sampled measurements;

perform a gain error test on the current sensors utilizing the sampled measurements;

perform an offset error test on the two current sensors utilizing the sampled measurements, and determine, utilizing said tests, that a fault exists and preliminarily identify which of the two current sensors may be at fault.

2. A method in accordance with claim 1 wherein said performing a balancing test comprises operating the processor to determine whether the sampled currents in each of the two of the three windings represented by the sampled measurements are of equal magnitude and opposite phase, within a predetermined limit.

3. A method in accordance with claim 1 wherein said performing a gain error test comprises operating the processor to determine whether the root mean square values of the sampled currents in each of the two of the three windings represented by the sampled measurements are within a predetermined nominal range.

4. A method in accordance with claim 1 wherein said performing an offset error test comprises operating the processor to determine whether the sum of the sampled currents in the two windings represented by the sampled measurements are less than a predetermined value or values.

5. A method in accordance with claim 1 further comprising, when a fault exists, operating a processor to:

successively apply a second test voltage waveform between each pair of the three windings with the remaining non-paired winding shorted to one winding of the pair;

sample measurements from the two current sensors as a function of time;

determine, utilizing said sampled measurements resulting from the application of the second test voltage, that the identified current sensor is at fault.

6. An apparatus for controlling an electric machine having current sensors for less than every one of its phases, said apparatus comprising:

an inverter configured to provide current to the electric machine;

a processor configured to control the current provided to the electric machine by the inverter in accordance with a desired torque, power, or speed;

said processor further configured to utilize the inverter to test the current sensors to determine whether a fault exists in one or more of the current sensors, and if a fault is determined to exist, to utilize a state observer of the electric machine to estimate states of the electric machine, utilizing state input measurements from each non-faulty current sensor, if any, disregarding the current sensor or sensors determined to be faulty; and to control the electric machine utilizing the inverter and results from the state observer;

said processor further configured to:

perform a test to preliminarily determine that a fault exists in one or more of the current sensors; and perform a test to finally determine that the fault exists in the one or more current sensors;

wherein the electric machine is a three-phase motor having three windings with current sensors on two of the three windings, and wherein to perform a test to preliminarily determine that a fault exists in one or more of the current sensors, said processor is configured to:

operate the inverter to apply a first test voltage waveform to the two of the three windings having a current sensor;

sample measurements from the two current sensors as a function of time;

perform a balancing test on the two windings with current sensors utilizing the sampled measurements;

perform a gain error test on the current sensors utilizing the sampled measurements;

perform an offset error test on the two current sensors utilizing the sampled measurements; and determine, utilizing said tests, that a fault exists and preliminarily identify which of the two current sensors may be at fault.

7. An apparatus in accordance with claim 6 wherein to perform a balancing test, said processor is further configured to determine whether the sampled currents in each of the two of the three windings represented by the sampled measurements are of equal magnitude and opposite phase, within a predetermined limit.

8. An apparatus in accordance with claim 6 wherein to perform a gain error test, said processor is further configured to determine whether the root mean square values of the sampled currents in each of the two of the three windings represented by the sampled measurements are within a predetermined nominal range.

9. An apparatus in accordance with claim 6 wherein to perform an offset error test, said processor is configured to determine whether the sums of the sampled currents in the two windings represented by the sampled measurements are less than a predetermined value or values.

10. An apparatus in accordance with claim 6 wherein said processor is configured to:

control the inverter to successively apply a second test voltage waveform between each pair of the three windings with the remaining non-paired winding shorted to one winding of the pair;

sample measurements from the two current sensors as a function of time; and determine, utilizing the sampled measurements resulting from the application of the second test voltage, that the identified current sensor is at fault.

* * * * *